April 7, 1964 — M. J. LUSH — 3,128,428
HIGH FREQUENCY THERMOCOUPLE VOLTMETER
Filed Dec. 19, 1960
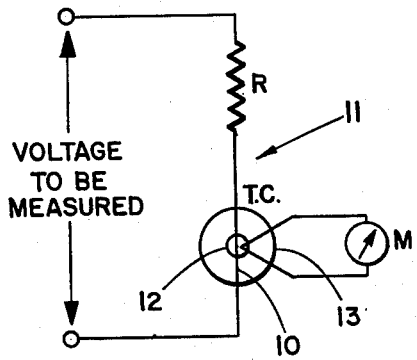
FIG. I
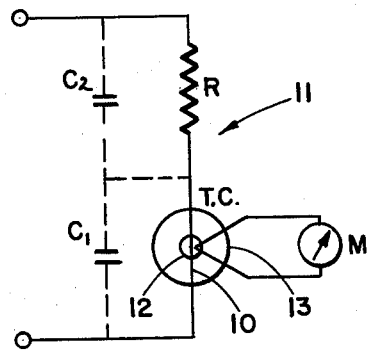
FIG. II
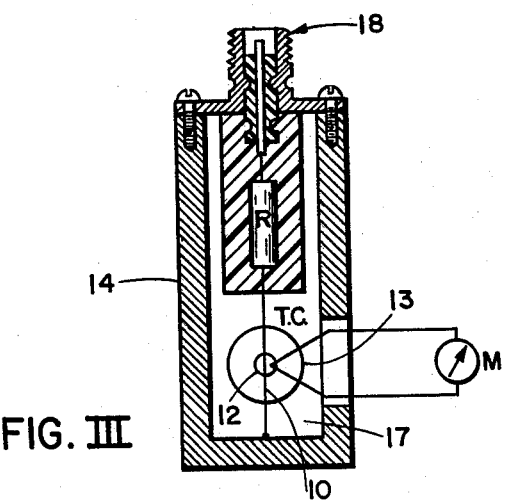
FIG. III
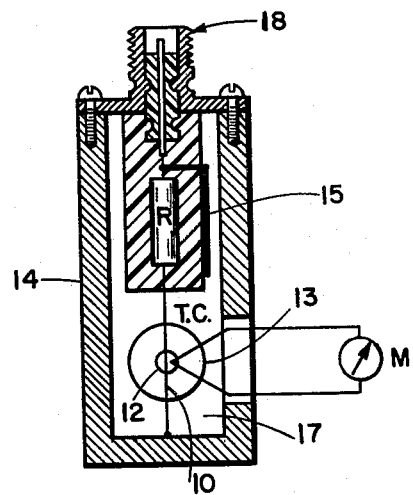
FIG. IV
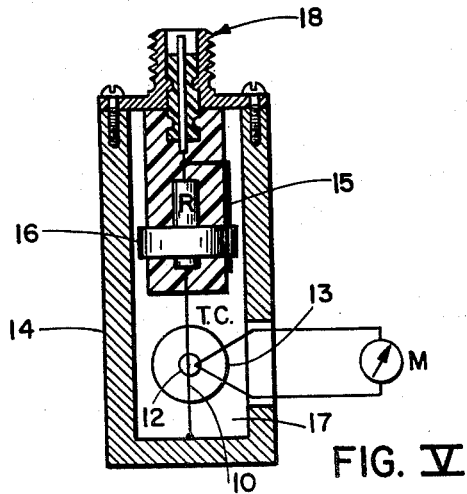
FIG. V
INVENTOR.
MORLEY J. LUSH
BY Lawrence H. Poston
AGENT

United States Patent Office 3,128,428
Patented Apr. 7, 1964

3,128,428
HIGH FREQUENCY THERMOCOUPLE
VOLTMETER
Morley J. Lush, Old Road to Nine Acre Corner,
Concord, Mass.
Filed Dec. 19, 1960, Ser. No. 76,877
1 Claim. (Cl. 324—95)

This invention relates to voltmeters, and has particular reference to thermocouple type voltmeters.

This type of voltmeter has proved useful in many instances, but has had the substantial disadvantage of poor response to high frequencies due to distributed capacity effects.

This invention obviates such prior art disadvantage by incorporating capacity effects to balance out the undesirable distributed capacity effects.

It is therefore an object of this invention to provide a new and useful thermocouple voltmeter.

Other objects and advantages of this invention will be in part apparent and in part pointed out hereinafter, and in the accompanying drawings, wherein:

FIGURE I is a schematic electrical illustration of a thermocouple voltmeter according to this invention;

FIGURE II is based on FIGURE I, and illustrates, through dotted line connections, the capacity effects in this device;

FIGURE III is a structural illustration of a thermocouple voltmeter according to this invention;

FIGURE IV is based on FIGURE III and shows an additional capacity element in the form of a wire; and FIGURE V is based on FIGURE IV and shows another additional capacity element in the form of a metal sleeve.

Referring to FIGURE I, this is a general circuit illustration of all of the embodiments of this invention. It consists of a thermocouple unit TC in which a thermocouple of dissimilar metals is heated by a separate heater wire 10, carrying the current to be measured in the circuit generally indicated at 11. A series resistor R is provided to limit the current with respect to the voltage range which is desired, and an indicating meter M is provided for the output of the thermocouple.

The heater wire 10 and the measuring end of the thermocouple are embedded in a glass bead 12, in adjacency with each other, but without electrical connection therebetween.

The thermocouple unit may be enclosed in a glass bulb as at 13, and evacuated for higher sensitivity.

Distributed capacities in the system have considerable effect on the frequency response. To some extent, these act like two "lumped" capacitances as at $C_1$ and $C_2$ in FIGURE II. $C_1$ represents all the distributed capacitance across the heater wire 10 and the thermocouple to the walls of a metal containing unit 14 as seen in FIGURES III, IV, and V.

This $C_1$ capacitance acts to shunt the current away from the thermocouple heater, and therefore to consequently decrease the meter reading at high frequencies, thus introducing undesirable inaccuracies.

The $C_2$ capacitance represents all the distributed capacitances across the resistor element R. $C_2$ tends to increase the thermocouple heater current at high frequencies, and acts in the opposite direction to $C_1$.

By relating the value of $C_2$ to the value of $C_1$, the undesirable effects of $C_1$ may be balanced out and the usefulness of the voltmeter is extended to considerably higher frequencies.

In the FIGURE III structure, such balancing is built in to the device in the general relation between the resistor R and the walls of the containing unit 14, with suitable consideration of dielectric.

The FIGURE IV structure provides an additional feature in the form of a dead end wire 15, connected at one end to one end of the resistor R, with the wire 15 then extending parallel to the resistor R, as a capacity device. Thus $C_2$ may be adjusted according to the length, size, form, and location of wire 15. As a practical matter an overlength of the wire 15 may be installed, and then snipped off to meet the needs of a particular situation.

The FIGURE V structure provides another additional feature as a plus with respect to the FIGURE IV structure, in the form of a metal capacity member 16, which may be a sleeve ring and may be adjustable lengthwise of the unit, as an extension or adjunct to the capacity wire 15.

Thus this invention provides adjustment of the value of $C_2$, for example by sliding the ring 16 lengthwise of the unit to vary $C_2$.

The units of FIGURES III, IV, and V comprise the circuits mounted with the resistor R and the heater wire, in each case, in a straight line on the lengthwise axis of a cylindrical cavity 17 in the containing unit 14. The unit 14 is provided with a coaxial connector 18 at one end thereof and the circuit is through the resistance R, the heater wire 10, and then back along the face of the cavity 17, through electrical connection of the heater wire 10 to the metal container unit 14.

The inductance of these assemblies is very low because the current flowing back along the inside of the cavity is in the right direction to cancel most of the inductive effect of the current in the resistor R and in the thermocouple heater wire 10.

In all of the structures of FIGURES III, IV, and V, the resistor R is enclosed in a resin casting anchored to the coaxial input connector. This makes the assemblies rigid, so that capacitances will not be changed by changes in the position or location of the resistor. Thus, also, the end of the thermocouple is provided with a rigid mounting in each case.

The presence of the resin as a dielectric alters the distribution of the capacitances and to some extent can be designed to provide the desired $C_2$. However, it is often desirable to be able to vary $C_2$ after the casting of R in the resin. Suitable clearance is provided between the resin and the container 14 and the capacity wire 15 and/or the capacity sleeve 16 are located in such clearance, to provide the desired $C_2$ adjustment as by shortening the wire by snipping, or by sliding the tightly fitting sleeve 16 along the cylindrical resin casting.

The capacitances from the wire 15 or sleeve 16 to the resistor R are directly in parallel with the original $C_2$ capacitance.

This invention, therefore, provides a new and useful thermocouple voltmeter, especially effective at high frequencies.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:

A thermocouple voltmeter with high frequency response, comprising, in combination, a cylindrical electrically conductive housing having one end closed and the other open, an electrical series assembly mounted in said housing through said open end in closing relation therewith and along the axis of said housing and concentrically thereof, in such dimension as to provide a cylindrical sleeve air gap between the inner wall of said housing and said assembly said series assembly comprising a resistor individually and cylindrically encapsulated in resin as a rigid dielectric, and a heater wire, an adjacent thermocouple responsive to said heater wire, said series assembly being electrically insulated from said housing at said open end thereof and electrically connected thereto at said closed end, a capacity wire connected at one end only, electrically, to one end of said resistor, said capacity wire extending radially from said last named connection to the periphery of said resin cylinder and thence along the surface of said resin cylinder to a lesser length than said resin and adjustable to a desired specific length and in parallel, capacity relation with said resistor between said resin and said housing, whereby the distributed capacity of the combination of said resistor and said capacity wire effectively balances out the distributed capacity across said heater wire and said thermocouple, and a measuring meter responsive to said thermocouple, whereby said capacity wire is provided with an air dielectric between it and the inner wall of the housing and a fixed, resin, dielectric between it and the resistor.

References Cited in the file of this patent

UNITED STATES PATENTS

| | | |
|---|---|---|
| 2,464,277 | Webber | Mar. 15, 1949 |
| 2,946,005 | Waterfield | July 19, 1960 |

OTHER REFERENCES

A.I.E.E. Transactions Paper No. 60–135, titled Thermal Voltage Converters for Voltage Measurements to 30 Megacycles, by Hermach and Williams, Dec. 10, 1959.